United States Patent
Salter et al.

(10) Patent No.: US 9,497,233 B2
(45) Date of Patent: *Nov. 15, 2016

(54) APPLICATION OF A NON-SECURE WARNING TONE TO A PACKETISED VOICE SIGNAL

(75) Inventors: Robert John Salter, Lyndhurst (GB); Stephen Matthew Allan Jenner, Fordingbridge (GB)

(73) Assignee: BAE SYSTEMS PLC, London (GB)

( * ) Notice: Subject to any disclaimer, the term of this patent is extended or adjusted under 35 U.S.C. 154(b) by 467 days.

This patent is subject to a terminal disclaimer.

(21) Appl. No.: 14/000,277

(22) PCT Filed: Feb. 15, 2012

(86) PCT No.: PCT/GB2012/050338
§ 371 (c)(1), (2), (4) Date: Dec. 2, 2013

(87) PCT Pub. No.: WO2012/110810
PCT Pub. Date: Aug. 23, 2012

(65) Prior Publication Data
US 2014/0086236 A1    Mar. 27, 2014

(30) Foreign Application Priority Data

Feb. 18, 2011  (EP) .................................. 11275031
Feb. 18, 2011  (GB) .................................. 1102864.4

(51) Int. Cl.
*H04M 3/22* (2006.01)
*H04L 29/06* (2006.01)
*H04M 3/20* (2006.01)
*H04M 7/00* (2006.01)

(52) U.S. Cl.
CPC ........... *H04L 65/1083* (2013.01); *H04M 3/205* (2013.01); *H04M 7/0078* (2013.01)

(58) Field of Classification Search
None
See application file for complete search history.

(56) References Cited

U.S. PATENT DOCUMENTS

| 7,069,432 | B1 | 6/2006 | Tighe et al. |
| 7,562,389 | B1 | 7/2009 | Goyal et al. |
| 7,684,383 | B1 * | 3/2010 | Thompson ........... H04M 7/1295 370/352 |
| 2006/0098623 | A1 * | 5/2006 | Christian ................. H04K 1/02 370/352 |
| 2007/0127453 | A1 | 6/2007 | Shibata |
| 2008/0019381 | A1 | 1/2008 | Mills et al. |

(Continued)

FOREIGN PATENT DOCUMENTS

| GB | 2 449 410 A | 11/2008 |
| WO | WO 03/075530 A1 | 9/2003 |
| WO | WO2006/107563 A2 | 10/2006 |
| WO | WO 2008/011239 A2 | 1/2008 |
| WO | WO 2010/144737 A2 | 12/2010 |

OTHER PUBLICATIONS

International Search Report (PCT/ISA/210) issued on Apr. 18, 2012, by the United Kingdom Patent Office as the International Searching Authority for International Application No. PCT/EP2012/050347.

(Continued)

*Primary Examiner* — Duc Duong
(74) *Attorney, Agent, or Firm* — Maine Cernota & Rardin

(57) ABSTRACT

A method is disclosed of applying a non-secure warning tone to a packetized voice signal which includes receiving a voice signal containing a sequence of voice samples; providing a non-secure warning tone signal containing a plurality of tone samples; and modifying the voice signal by selectively including tone samples in the sequence of voice samples.

16 Claims, 5 Drawing Sheets

(56) References Cited

U.S. PATENT DOCUMENTS

| | | | |
|---|---|---|---|
| 2008/0133761 | A1 | 6/2008 | Polk |
| 2008/0141331 | A1 | 6/2008 | Taker et al. |
| 2009/0086631 | A1* | 4/2009 | Jayapalan ............... H04L 65/80 370/231 |
| 2010/0082828 | A1 | 4/2010 | Jennings et al. |
| 2010/0115630 | A1 | 5/2010 | Maire et al. |
| 2011/0105179 | A1* | 5/2011 | Tanabe .............. H04M 1/72533 455/556.1 |
| 2011/0208517 | A1* | 8/2011 | Zopf ....................... G10L 21/04 704/211 |
| 2011/0216664 | A1* | 9/2011 | Okada ..................... H04L 12/26 370/252 |
| 2012/0143612 | A1* | 6/2012 | Yu ...................... H04N 21/4126 704/500 |
| 2013/0136242 | A1* | 5/2013 | Ross ....................... H04M 3/51 379/85 |
| 2014/0044279 | A1* | 2/2014 | Kim .................... G10L 21/0272 381/92 |

OTHER PUBLICATIONS

European Search Report issued on Jun. 14, 2011.
United Kingdom Search Report issued on May 12, 2011.
International Search Report (PCT/ISA/210) issued on Apr. 18, 2012, by the United Kingdom Patent Office as the International Searching Authority for International Application No. PCT/EP2012/050338.
Written Opinion (PCT/ISA/237) issued on Apr. 18, 2012, by the European Patent Office as the International Searching Authority for International Application No. PCT/EP2012/050338.
European Search Report issued on Jun. 9, 2011.
United Kingdom Search Report issued on May 11, 2011.
"Cisco Unified Communications Manager Security Guide", Release 8.5(1), Cisco Systems 2010, Available from http?//www.cisco.com/en/US/docs/voice_ip_comm/cucm/security/8_5_1/secugd/sectone.htlm [Accessed May 10, 2011], See Chapter 8 (Configuring Secure and Nonsecure Indication Tones).

* cited by examiner

APPLICATION OF A NON-SECURE WARNING TONE TO A PACKETISED VOICE SIGNAL

The invention relates to a method of applying a non-secure warning tone to a packetized voice signal. The invention further relates to non-secure warning tone application apparatus.

It may be desirable during a telephone call between two or more parties to be able to indicate to one party to the call that one or more other parties to the call is a non-trusted party. This is typically done by applying a non-secure warning tone to the voice signal received from the non-trusted party, so that an audible warning is heard over the call by the receiving party. Non-secure warning tones are known to be applied to analogue voice signals by mixing a non-secure warning tone signal with the received voice signal. The non-secure warning tone signal typically has a signal level which is lower than the level of the voice signal, so that the non-secure warning tone does not prevent the receiving party from correctly hearing what the non-trusted party is saying. Voice calls are increasingly being made over internet protocol (IP) networks and it may be beneficial also to be able to apply a non-secure warning tone to this type of voice call.

A first aspect of the invention provides a method of applying a non-secure warning tone to a packetized voice signal, the method comprising
  receiving a voice signal comprising a sequence of voice samples;
  providing a non-secure warning tone signal comprising a plurality of tone samples; and
  modifying the voice signal by selectively including tone samples in the sequence of voice samples.

Modifying the voice signal in this way may enable the application of a non-secure warning tone to a packetized voice signal while minimising disruption of the voice signal. Modifying a voice signal by including tone samples may corrupt a data signal comprising data samples which is being transmitted across a voice signal path, and may prevent a data signal from being covertly transmitted across a voice signal path.

In an embodiment, the voice signal is modified by selecting a plurality of the voice samples and replacing each selected voice sample with a respective tone sample. Replacement of voice samples with tone samples may enable a caller to adjust the voice call volume relative to the non-secure warning tone volume. Replacement of voice samples with tone samples may provide a resulting voice call having a non-secure warning tone which is easy and pleasant to listen to.

In an embodiment, the voice signal is modified by selecting a plurality of the voice samples and combining each selected voice sample with a respective tone sample to form a combined sample. This may enable the relative and absolute levels of the tone samples and the voice samples to be varied while clamping the minimum and maximum non-secure warning tone amplitude on the voice call between pre-selected limits.

In an embodiment, the combined sample comprises a weighted average of the respective voice sample and tone sample.

In an embodiment, alternate voice samples are selected. A non-secure warning tone may thereby be applied to the voice signal which may be heard without obscuring the voice call and may maximise the intelligibility of a voice call having a non-secure warning tone on it.

In an embodiment, one in up to every four voice samples is selected. This may reduce the amount of signal processing required without affecting the intelligibility of the voice call.

In an embodiment, method comprises periodically modifying the voice signal. A non-secure warning tone may therefore be applied during only selected parts of a voice call. A periodically repeating non-secure warning tone may thus be applied to a packetized voice signal. A non-secure warning tone may therefore be applied which may not distract a receiving party from the content of a voice call.

In an embodiment, the tone signal comprises periodically occurring tone periods each comprising a plurality of tone samples. A periodic modification of the voice signal is therefore achieved modifying the voice signal with a periodic tone signal, which only comprises tone samples within periodically occurring tone periods.

In an embodiment, the sequence of voice samples is provided as a sequence of voice packets and the method further comprises comparing a structural feature of a voice packet of the voice signal with a reference structural feature and determining whether said structural feature is the same as said reference feature, and if said structural feature is the same as said reference feature validating the voice packet as comprising an acceptable voice packet. This may prevent unacceptable voice packets or data packets from being transmitted across a voice signal path within a communications network.

In an embodiment, said structural feature comprises at least one of packet length, packet header and voice header.

In an embodiment, the voice signal has a voice over internet protocol signal format.

In an embodiment, each voice packet has a packet length of between 10 ms and 50 ms In an embodiment, the non-secure warning tone signal has a lower signal level than the voice signal. The non-secure warning tone may therefore be heard in the background of a voice call.

A second aspect of the invention provides non-secure warning tone application apparatus comprising:
  a port arranged to receive a voice signal comprising a sequence of voice samples;
  a non-secure warning tone signal source arranged to generate a non-secure warning tone signal comprising a plurality of tone samples; and
  signal modification apparatus arranged to selectively include tone samples in the sequence of voice samples.

The apparatus may apply a non-secure warning tone to a packetized voice signal while minimising disruption of the voice signal The apparatus may modify a voice signal by including tone samples which may corrupt a data signal comprising data samples which is being transmitted across a voice signal path through the non-secure warning tone application apparatus, and may prevent a data signal from being covertly transmitted across the voice signal path.

In an embodiment, the signal modification apparatus is arranged to select a plurality of the voice samples and replace each selected voice sample with a respective tone sample. The tone samples may be provided with a constant amplitude which may ensure that they are always audible and easily recognised. Replacement of voice samples with tone samples may enable a caller to adjust the voice call volume relative to the non-secure warning tone volume. Replacement of voice samples with tone samples may provide a resulting voice call having a non-secure warning tone which is easy and pleasant to listen to.

In an embodiment, the signal modification apparatus is arranged to select a plurality of the voice samples and to combine each selected voice sample with a respective tone sample to form a combined sample. This may enable the relative and absolute levels of the tone samples and the voice samples to be varied while clamping the minimum and maximum non-secure warning tone amplitude on the voice call between pre-selected limits.

In an embodiment, each combined sample comprises a weighted average of the respective voice sample and tone sample.

In an embodiment, the signal modification apparatus is arranged to select alternate voice samples. A non-secure warning tone may thereby be applied to the voice signal which may be heard without obscuring the voice call and may maximise the intelligibility of a voice call having a non-secure warning tone on it.

In an embodiment, the signal modification apparatus is arranged to select one in up to every four voice samples. This may reduce the amount of signal processing required without affecting the intelligibility of the voice call.

In an embodiment, the non-secure warning tone application apparatus is arranged to periodically modify the voice signal. The non-secure warning tone application apparatus may thereby apply a non-secure warning tone during only selected parts of a voice call. A periodically repeating non-secure warning tone may thus be applied to a packetized voice signal. A non-secure warning tone may therefore be applied which may not distract a receiving party from the content of a voice call.

In an embodiment, the non-secure warning tone signal source is arranged to generate a tone signal comprising periodically occurring tone periods each comprising a plurality of tone samples and the signal modification apparatus is arranged to selectively include tone samples in the sequence of voice samples during the tone periods. A periodic modification of the voice signal is therefore achieved modifying the voice signal with a periodic tone signal, which only comprises tone samples within periodically occurring tone periods.

In an embodiment, the sequence of voice samples is provided as a sequence of voice packets and the apparatus further comprises voice signal validation apparatus arranged to compare a structural feature of a voice packet of the voice signal with a reference structural feature and arranged to determine whether said structural feature is the same as said reference feature. If said structural feature is the same as said reference feature the voice signal validation apparatus may validate the voice packet as comprising an acceptable voice packet. If said structural feature is not the same as said reference feature the voice signal validation apparatus may reject the voice packet as comprising an acceptable voice packet. This may prevent unacceptable voice packets or data packets from being transmitted by the non-secure warning tone application apparatus.

In an embodiment, said structural feature comprises at least one of packet length, packet header and voice header.

In an embodiment, the voice signal has a voice over internet protocol signal format.

In an embodiment, each voice packet has a packet length of between 10 ms and 50 ms. In an embodiment, the non-secure warning tone signal has a lower signal level than the voice signal. The non-secure warning tone may therefore be heard in the background of a voice call.

Embodiments of the invention will now be described by way of example only, with reference to the accompanying drawings, in which.

Figure 1:
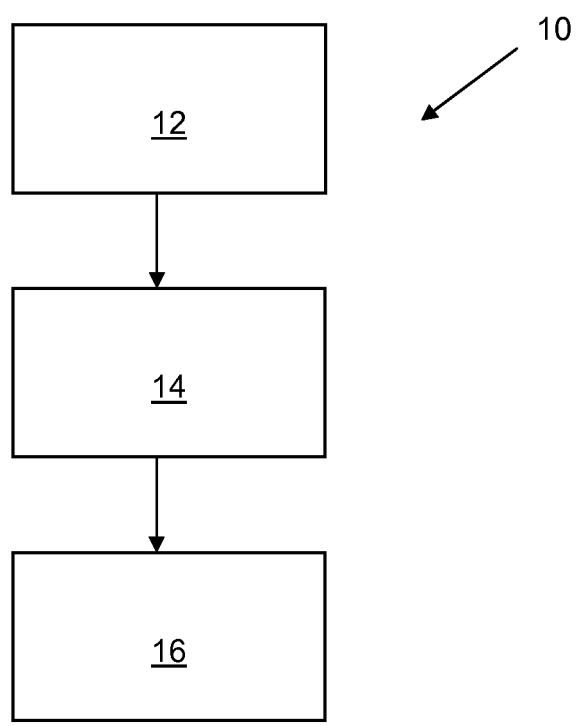
FIG. 1 is a flow chart showing the steps of a method of applying a non-secure warning tone to a packetized voice signal according to a first embodiment of the invention.

Referring to FIG. 1, a first embodiment of the invention provides a method 10 of applying a non-secure warning tone to a packetized voice signal. The method 10 comprises:

receiving a voice signal comprising a sequence of voice samples 12;

providing a non-secure warning tone signal comprising a plurality of tone samples 14; and modifying the voice signal by selectively including tone samples in the sequence of voice samples 16.

A second embodiment of the invention provides a method of applying a non-secure warning tone to a packetized voice signal which is substantially the same as the method 10 of FIG. 1, with the following modifications. The method of this embodiment will be described with reference to FIG. 1 retaining the same reference numbers for corresponding steps.

In this embodiment, the voice signal has a voice over internet protocol (VoIP) signal format. The voice signal is modified by selecting some of the voice samples and replacing each selected voice sample with a respective tone sample.

A third embodiment of the invention provides a method of applying a non-secure warning tone to a packetized voice signal which is substantially the same as the method 10 of FIG. 1, with the following modifications. The method of this embodiment will be described with reference to FIG. 1 retaining the same reference numbers for corresponding steps.

In this embodiment, the voice signal has a voice over internet protocol (VoIP) signal format. The voice signal is modified by selecting some of the voice samples and combining each selected voice sample with a respective tone sample to form a combined sample. In this example, the voice and tone samples are combined by taking a weighted average of each pair of voice sample and tone samples. The resulting voice signal therefore comprises a sequence of voice samples and combined samples.

A fourth embodiment of the invention provides a method of applying a non-secure warning tone to a packetized voice signal which is substantially the same as the method 10 of FIG. 1, with the following modifications. The method of this embodiment will be described with reference to FIG. 1 retaining the same reference numbers for corresponding steps.

In this embodiment, the voice signal is modified periodically, so that a non-secure warning tone is only applied to selected periods of a voice call, referred to as tone periods.

The method of this embodiment comprises modifying the voice signal only during tone periods. The tone periods are periodically occurring so that a periodic non-secure warning tone is applied to the voice signal. Applying a periodic non-secure warning tone may enable a receiving party to be made aware that they are holding a call with a non-trusted party without distracting the receiving party from the content of the call. This may ensure that the non-trusted party does not receive any indication (by, for example, the receiving party missing part of what is being said by the non-trusted party and requesting them to repeat it) that a non-secure warning tone is being heard by the receiving party. The non-trusted party may therefore be kept unaware of their non-trusted status.

In this embodiment, the voice signal is modified by selecting alternate ones of the voice samples within each tone period and replacing each selected voice sample with a respective tone sample. A non-secure warning tone may thereby be applied to the voice signal which may be heard without obscuring the voice call and may maximise the intelligibility of a voice call having a non-secure warning tone on it.

In an alternative embodiment, the voice signal is modified by selecting every fourth voice sample within each tone period and replacing each selected voice sample with a respective tone sample. Up to every fourth voice sample may be selected to be replaced by a tone sample, that is to say every second, third or fourth voice sample may be selected. This may reduce the amount of signal processing required without affecting the intelligibility of the voice call.

Figure 2:
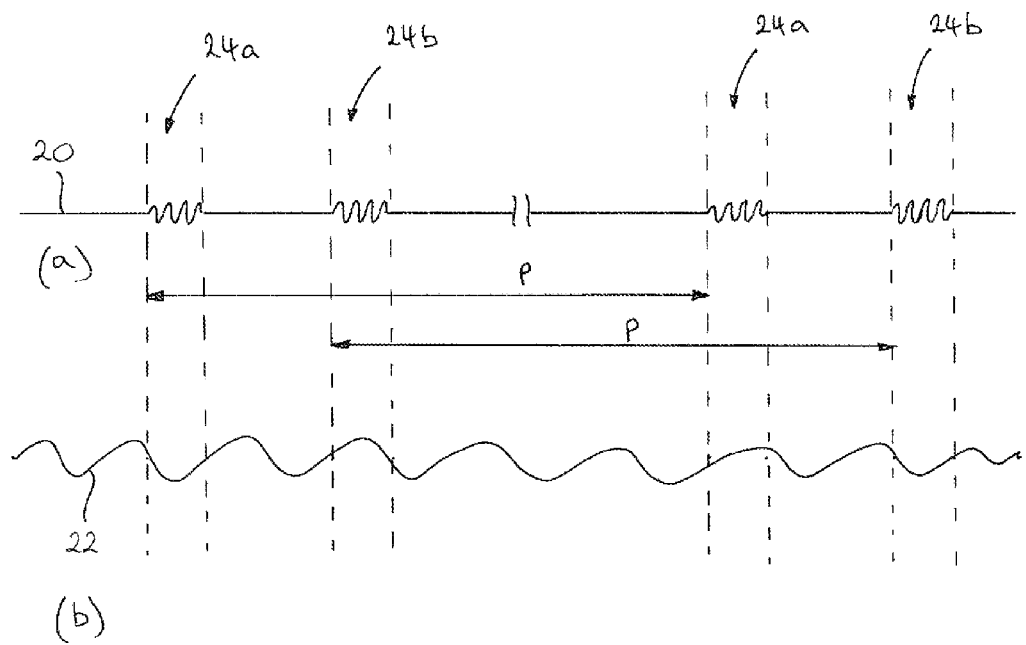
FIG. 2 is a graphical representation of audio patterns of (a) a voice signal and (b) a non-secure warning tone signal to be merged with the voice signal.

FIG. 2 illustrates the audio patterns of a tone signal 20 and a voice signal 22. In the example shown in FIG. 2 the tone signal 20 is intermittent and therefore provides tone samples only during tone periods 24a, 24b, which repeat at a periodicity P. In this example, the tone signal 20 comprises first tone samples arranged to provide a first frequency tone, for example "beep", in each of the first tone periods 24a and comprises second tone samples arranged to provide a second frequency tone, for example "bop", in each of the second tone periods 24b. A periodic modification of the voice signal 22 is therefore achieved in this example by providing a periodic tone signal, which only comprises tone samples within periodically occurring tone periods 24. A repeating "beep" "bop" non-secure warning tone is thereby applied to the voice signal 22.

The non-secure warning tone signal has a lower signal level than the voice signal so that the voice call can be clearly heard over the non-secure warning tone during tone periods. This is advantageous in ensuring that the voice call is not corrupted or obscured during tone periods.

Figure 3:
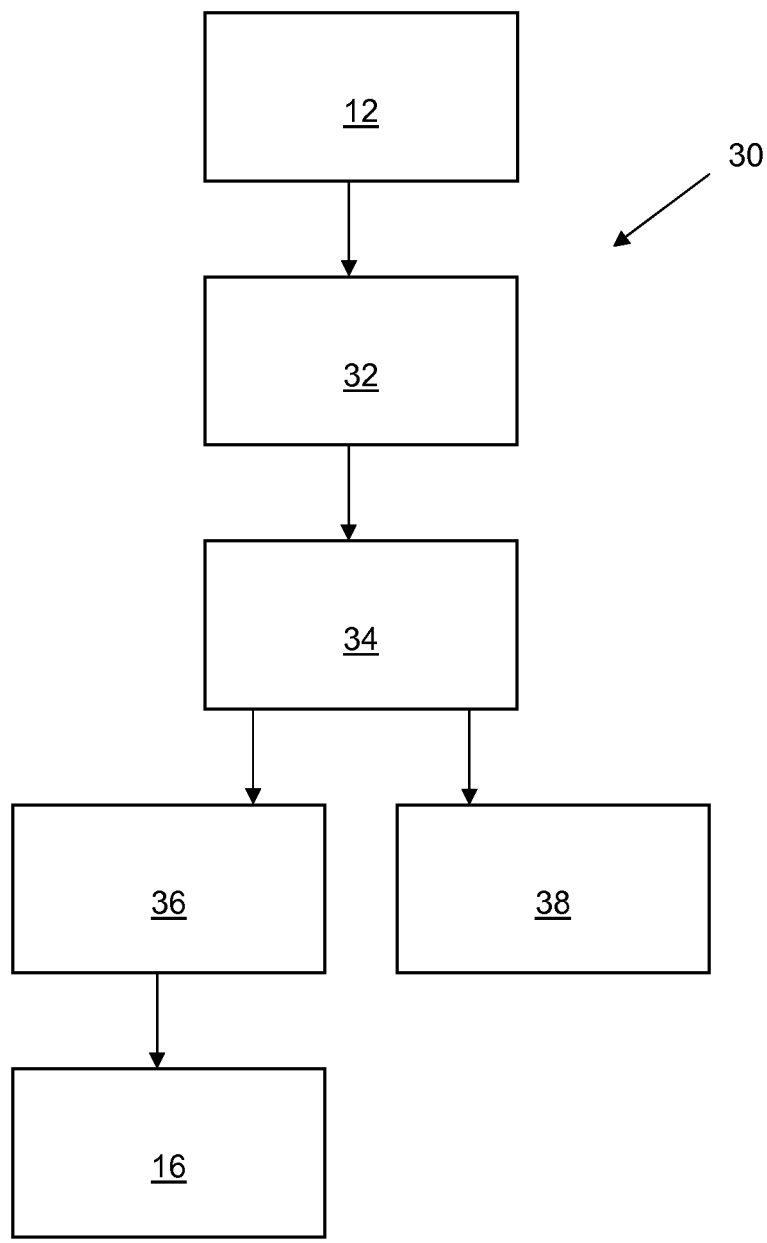
FIG. 3 is a flow chart showing the steps of a method of applying a non-secure warning tone to a packetized voice signal according to a fifth embodiment of the invention.

Referring to FIG. 3, a fifth embodiment of the invention provides a method 30 of applying a non-secure warning tone to a packetized voice signal which is substantially the same as the method 10 of FIG. 1, with the following modifications. The same reference numbers are retained for corresponding steps.

In this embodiment, the sequence of voice samples is provided as a sequence of voice packets and the voice signal has a voice over internet protocol (VoIP) signal format. Each voice packet has a packet length of 20 ms and comprises 160 voice samples each having a sample length of 0.125 ms. The method 30 of this embodiment further comprises comparing a structural feature of a voice packet of the voice signal with a reference structural feature 32 and determining whether said structural feature is the same as said reference feature 34. If the structural feature is the same as the reference feature, the voice packet is validated as being an acceptable voice packet 36 and the voice signal is modified with the tone samples 16, as described above. If the structural feature is not same as the reference feature, the voice packet is not validated as being an acceptable voice packet 38 and the voice signal is not modified with the tone samples 16.

The structural feature to be compared for validation may comprise packet length, packet header or voice header. A voice packet has a well known structure and will have a pre-selected length, packet header and voice header, each of which may be stored as a reference structural feature. It will be appreciated that one or more of the structural features may be compared with the corresponding reference structural feature during the validation step. Other structural features may alternatively be used.

Figure 4:
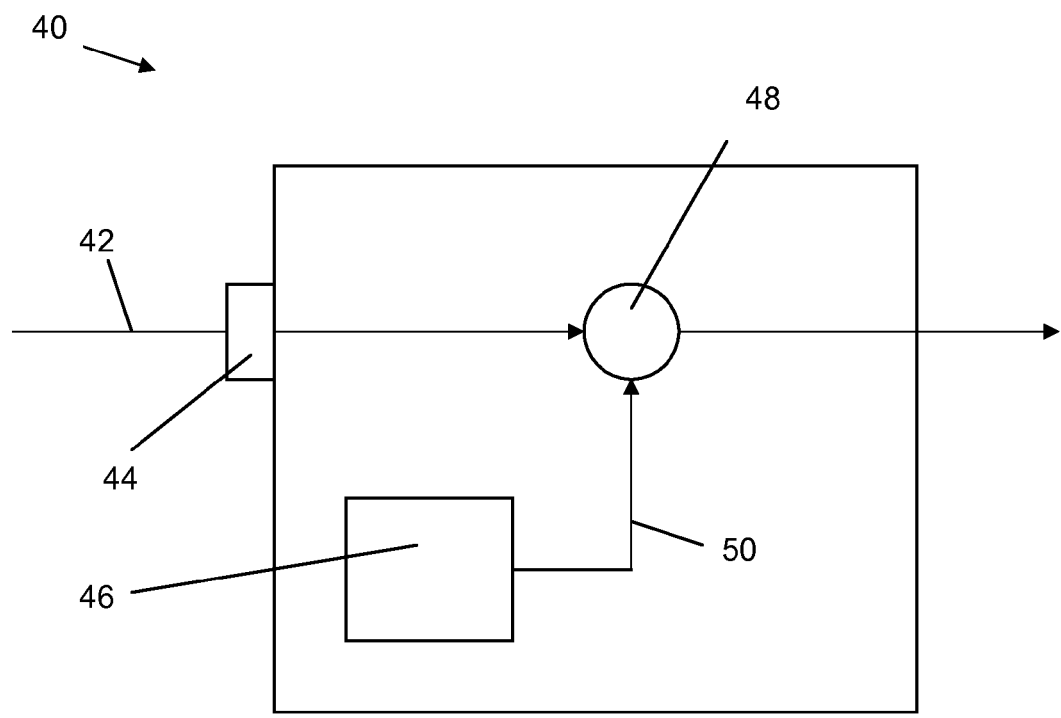
FIG. 4 is a schematic illustration of a non-secure warning tone application apparatus according to a sixth embodiment of the invention.

A sixth embodiment of the invention provides non-secure warning tone application apparatus 40 as shown in FIG. 4.

The apparatus 40 comprises a port 42 arranged to receive a voice signal 44 comprising a sequence of voice samples, a non-secure warning tone signal source 46 and signal modification apparatus 48.

The non-secure warning tone signal source 46 is arranged to generate a non-secure warning tone signal 50 comprising a plurality of tone samples. The signal modification apparatus 48 is arranged to modify the voice signal 44 by selectively including tone samples of the tone signal 50 in the sequence of voice samples.

A seventh embodiment of the invention provides non-secure warning tone application apparatus which is similar to the apparatus 40 shown in FIG. 4, with the following modifications. This embodiment will be described with reference to FIG. 4.

In this embodiment, the port 42 arranged to receive a voice signal 44 having a VoIP signal format. The signal modification apparatus 48 is arranged to select some of the voice samples of the voice signal 44 and to replace each selected voice sample with a respective tone sample.

An eighth embodiment of the invention provides non-secure warning tone application apparatus which is similar to the apparatus 40 shown in FIG. 4, with the following modifications. This embodiment will be described with reference to FIG. 4.

In this embodiment, the port 42 arranged to receive a voice signal 44 having a VoIP signal format. The signal modification apparatus 48 is arranged to select some of the voice samples of the voice signal 44 and to combine each selected voice sample with a respective tone sample to form a combined sample. In this example, the signal modification apparatus 48 is arranged to combine the voice and tone samples by taking a weighted average of each pair of voice sample and tone samples. The resulting voice signal therefore comprises a sequence of voice samples and combined samples.

A ninth embodiment of the invention provides non-secure warning tone application apparatus which is similar to the apparatus 40 shown in FIG. 4, with the following modifications. This embodiment will be described with reference to FIG. 4.

In this embodiment, the signal modification apparatus 48 is arranged to modify the voice signal 44 periodically, so that a non-secure warning tone is only applied to selected periods of a voice call, referred to as tone periods.

The method of this embodiment comprises modifying the voice signal only during tone periods. The tone periods are periodically occurring so that a periodic non-secure warning tone is applied to the voice signal. Applying a periodic non-secure warning tone may enable a receiving party to be made aware that they are holding a call with a non-trusted party without distracting the receiving party from the content of the call. This may ensure that the non-trusted party does not receive any indication (by, for example, the receiving party missing part of what is being said by the non-trusted party and requesting them to repeat it) that a non-secure warning tone is being heard by the receiving party. The non-trusted party may therefore be kept unaware of their non-trusted status.

Referring again to FIG. 2, which illustrates the audio patterns of the tone signal 50 (reference number 20 in FIG. 2) and the voice signal 42 (22 in FIG. 2), the tone signal 20 provides a tone samples during tone periods 24a, 24b, which repeat at a periodicity P. In this example, the non-secure warning tone signal source 46 is arranged to generate first tone samples arranged to provide a tone signal 50 at a first frequency tone, for example "beep", in the first tone periods 24a and to generate second tone samples arranged to provide a second frequency tone, for example "bop", in the second tone periods

24b. This results in a repeating "beep" "bop" non-secure warning tone being applied to the voice signal 22.

A tenth embodiment of the invention provides non-secure warning tone application apparatus which is similar to the apparatus 40 of the previous embodiment, with the following modifications. This embodiment will also be described with reference to FIG. 4.

In this embodiment, the voice signal has a voice over internet protocol (VoIP) signal format. The signal modification apparatus 48 is arranged to select alternate ones of the voice samples within each tone period and to replace each selected voice sample with a respective tone sample. A non-secure warning tone may thereby be applied to the voice signal which may be heard without obscuring the voice call and may maximise the intelligibility of a voice call having a non-secure warning tone on it.

An eleventh embodiment of the invention provides non-secure warning tone application apparatus which is similar to the apparatus 40 of the previous embodiment, with the following modifications. This embodiment will also be described with reference to FIG. 4.

In this embodiment, the voice signal has a voice over internet protocol (VoIP) signal format. The signal modification apparatus 48 is arranged to select every fourth voice sample within each tone period and to replace each selected voice sample with a respective tone sample. This may reduce the amount of signal processing required by the signal modification apparatus 48 without affecting the intelligibility of the voice call.

The signal merging apparatus 48 may alternatively be arranged to select every second or third voice sample.

The non-secure warning tone signal source 46 is arranged to generate a non-secure warning tone signal 50 having a lower signal level than the voice signal 42 so that the voice call can be clearly heard over the non-secure warning tone during tone periods. This is advantageous in ensuring that the voice call is not corrupted or obscured during tone periods.

Figure 5:
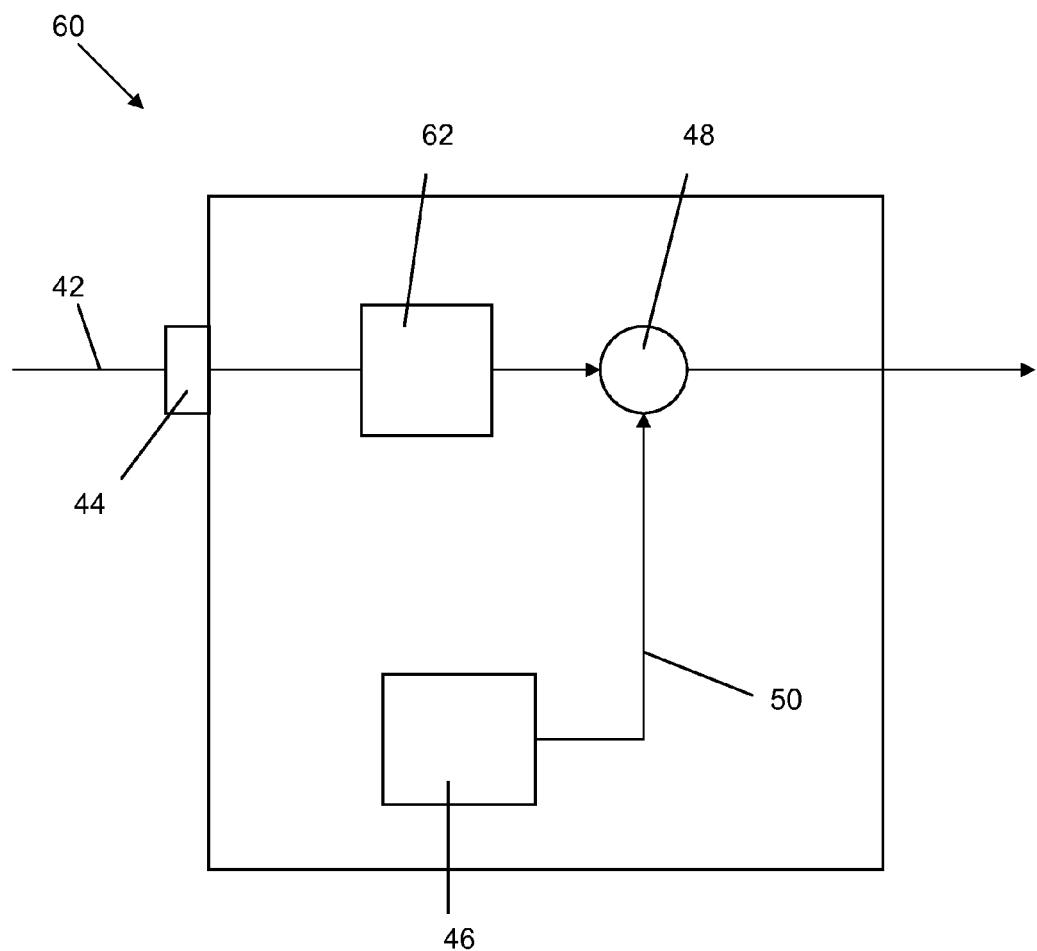
FIG. 5 is a schematic illustration of a non-secure warning tone application apparatus according to a tenth embodiment of the invention.

Referring to FIG. 5, a twelfth embodiment of the invention provides non-secure warning tone application apparatus 60 which is similar to the non-secure warning tone application apparatus 40 shown in FIG. 4, with the following modifications. The same reference numbers are retained for corresponding features.

In this embodiment, the voice signal has a voice over internet protocol (VoIP) signal format and the sequence of voice samples is provided as a sequence of voice packets. Each voice packet has a packet length of 20 ms and comprises 160 voice samples each having a sample length of 0.125 ms. The apparatus 60 further comprises voice signal validation apparatus 62 arranged to compare a structural feature of a voice packet of the voice signal 42 with a reference structural feature. The structural feature is selected from one of packet length, packet header and voice header. A voice packet has a well known structure and will have a pre-selected length, packet header and voice header, each which may be stored as a reference structural feature. It will be appreciated that one or more of the structural features may be compared with the corresponding reference structural feature during the validation step. Other structural features may alternatively be used.

The validation apparatus 62 is further arranged to determine whether the selected structural feature is the same as the reference feature. If the structural feature is the same as the reference feature the voice signal validation apparatus 62 is arranged to validate the voice packet as comprising an acceptable voice packet. If the structural feature is not the same as the reference feature, the voice signal validation apparatus 62 is arranged to reject the voice packet as comprising an acceptable voice packet. The validation apparatus 62 is further arranged to discard any voice packet which is rejected as being acceptable. In this way unacceptable voice packets or data packets may be prevented from being transmitted by the non-secure warning tone application apparatus 60.

The invention claimed is:

1. A method of applying a non-secure warning tone to a packetized voice signal, the method comprising:
   receiving a voice signal comprising a sequence of voice samples;
   providing a non-secure warning tone signal comprising a plurality of tone samples; and
   modifying the voice signal by selecting a plurality of the voice samples and combining each selected voice sample with a respective tone sample to form a combined sample, each combined sample comprising a weighted average of the respective voice sample and tone sample.

2. A method as claimed in claim 1, wherein the voice signal is modified by:
   selecting a plurality of the voice samples; and
   replacing each selected voice sample with a respective tone sample.

3. A method as claimed in claim 2, wherein the selecting comprises:
   selecting alternate voice samples.

4. A method as claimed in claim 2, wherein the selecting comprises:
   selecting one in up to every four voice samples.

5. A method as claimed in claim 1, wherein the sequence of voice samples is provided as a sequence of voice packets and the method comprises:
   comparing a structural feature of a voice packet of the voice signal with a reference structural feature;
   determining whether said structural feature is the same as said reference structural feature; and
   if said structural feature is determined to be the same as said reference structural feature validating the voice packet as comprising an acceptable voice packet.

6. A method as claimed in claim 5, wherein said structural feature comprises:
   at least one of packet length, packet header and voice header.

7. A non-secure warning tone application apparatus, comprising:
   a port configured to receive a voice signal having a sequence of voice samples;
   a non-secure warning tone signal source configured to generate a non-secure warning tone signal having a plurality of tone samples; and
   signal modification apparatus configured to select a plurality of the voice samples and to combine each selected voice sample with a respective tone sample to form a combined sample, each combined sample will comprising a weighted average of the respective voice sample and tone sample.

8. The non-secure warning tone application apparatus as claimed in claim 7, wherein the signal modification apparatus is configured to select a plurality of the voice samples and replace each selected voice sample with a respective tone sample.

9. The non-secure warning tone application apparatus as claimed in claim 8, wherein the signal modification apparatus is configured to select alternate voice samples.

10. The non-secure warning tone application apparatus as claimed in claim 8, wherein the signal modification apparatus is configured to select one in up to every four voice samples.

11. The non-secure warning tone application apparatus as claimed in claim 8, wherein for a sequence of voice samples provided as a sequence of voice packets, the apparatus comprises:
a voice signal validation apparatus configured to compare a structural feature of a voice packet of the voice signal with a reference structural feature, to determine whether said structural feature is the same as said reference structural feature, and if said structural feature is determined to be the same as said reference structural feature to validate the voice packet as comprising an acceptable voice packet.

12. The non-secure warning tone application apparatus as claimed in claim 7, wherein for a sequence of voice samples provided as a sequence of voice packets, the apparatus comprises:
a voice signal validation apparatus configured to compare a structural feature of a voice packet of the voice signal with a reference structural feature, to determine whether said structural feature is the same as said reference structural feature, and if said structural feature is determined to be the same as said reference structural feature to validate the voice packet as comprising an acceptable voice packet.

13. The non-secure warning tone application apparatus as claimed in claim 12, wherein said structural feature comprises:
at least one of packet length, packet header and voice header.

14. The non-secure warning tone application apparatus as claimed in claim 12, wherein the signal modification apparatus is configured to select alternate voice samples.

15. The non-secure warning tone application apparatus as claimed in claim 7, wherein the signal modification apparatus is configured to select one in up to every four voice samples.

16. The non-secure warning tone application apparatus as claimed in claim 7, wherein for a sequence of voice samples provided as a sequence of voice packets, the apparatus comprises:
a voice signal validation apparatus configured to compare a structural feature of a voice packet of the voice signal with a reference structural feature, to determine whether said structural feature is the same as said reference structural feature, and if said structural feature is determined to be the same as said reference structural feature to validate the voice packet as comprising an acceptable voice packet.

\* \* \* \* \*